(12) United States Patent
Greven (10) Patent No.: US 11,327,946 B2
(45) Date of Patent: May 10, 2022

(54) HYBRID CENTRALIZED AND DECENTRALIZED ENTERPRISE SYSTEM

(71) Applicant: SAP SE, Walldorf (DE)

(72) Inventor: Boris Greven, Weinheim (DE)

(73) Assignee: SAP SE, Walldorf (DE)

( * ) Notice: Subject to any disclaimer, the term of this patent is extended or adjusted under 35 U.S.C. 154(b) by 198 days.

(21) Appl. No.: 16/280,164

(22) Filed: Feb. 20, 2019

(65) Prior Publication Data

US 2020/0265031 A1    Aug. 20, 2020

(51) Int. Cl.
*G06F 16/23* (2019.01)
*G06F 16/27* (2019.01)
*G06F 16/93* (2019.01)
*H04L 67/10* (2022.01)

(52) U.S. Cl.
CPC ...... *G06F 16/2358* (2019.01); *G06F 16/2379* (2019.01); *G06F 16/27* (2019.01); *G06F 16/93* (2019.01); *H04L 67/10* (2013.01); *H04L 2209/38* (2013.01)

(58) Field of Classification Search
CPC .. G06F 16/2358; G06F 16/27; G06F 16/2379; G06F 16/93; H04L 67/10; H04L 2209/38
See application file for complete search history.

(56) References Cited

U.S. PATENT DOCUMENTS

| 8,108,521 B2 | 1/2012 | Greven et al. |
| 2015/0278760 A1 | 10/2015 | Greven et al. |
| 2017/0161439 A1 | 6/2017 | Raduchel et al. |
| 2017/0243193 A1* | 8/2017 | Manian ................ G06Q 20/065 |
| 2018/0123779 A1* | 5/2018 | Zhang .................. H04L 9/0637 |
| 2018/0293557 A1* | 10/2018 | Kim .................... G06Q 20/3823 |
| 2018/0294966 A1 | 10/2018 | Hyun et al. |
| 2018/0322491 A1 | 11/2018 | Madisetti et al. |
| 2018/0365447 A1* | 12/2018 | Rice ...................... H04L 9/0637 |
| 2018/0374097 A1 | 12/2018 | Hanna |
| 2019/0020468 A1 | 1/2019 | Rosenoer |
| 2019/0028280 A1* | 1/2019 | Zinder .................. H04L 9/3239 |
| 2019/0058709 A1 | 2/2019 | Kempf et al. |
| 2019/0379531 A1 | 12/2019 | Aleksander et al. |
| 2020/0052899 A1 | 2/2020 | Finlow-Bates |

(Continued)

OTHER PUBLICATIONS

U.S. Appl. No. 16/280,183, Greven, filed Feb. 20, 2019.

(Continued)

*Primary Examiner* — Hosain T Alam
*Assistant Examiner* — Anthony G Gemignani
(74) *Attorney, Agent, or Firm* — Fish & Richardson P.C.

(57) ABSTRACT

Implementations of the present disclosure include receiving, by the centralized sub-system, change data representing a change to an electronic document stored in the centralized sub-system, the change data identifying a user that submitted the change, transmitting, by the centralized sub-system, the change to the decentralized sub-system, recording, by the decentralized sub-system, the change in a change log recorded in a blockchain that is maintained within the decentralized sub-system, the blockchain being stored in multiple nodes of the decentralized sub-system, and editing, by the centralized sub-system, the electronic document based on the change to provide an edited electronic document that is stored in the centralized sub-system.

20 Claims, 5 Drawing Sheets

(56) References Cited

U.S. PATENT DOCUMENTS

| | | |
|---|---|---|
| 2020/0134656 A1 | 4/2020 | Padmanabhan |
| 2020/0218795 A1 | 7/2020 | Antar et al. |
| 2020/0242595 A1 | 7/2020 | Harrison |
| 2020/0382603 A1 | 12/2020 | Qi et al. |

OTHER PUBLICATIONS

Non-Final Office Action issued in U.S. Appl. No. 16/280,183 dated Mar. 1, 2021, 23 pages.
Non-Final Office Action issued in U.S. Appl. No. 16/280,183 dated Dec. 3, 2021, 15 pages.

* cited by examiner

HYBRID CENTRALIZED AND DECENTRALIZED ENTERPRISE SYSTEM

BACKGROUND

Enterprises frequently use centralized systems for operations. In general, a centralized system can provide a database that stores information in a single location (e.g., server). For example, an enterprise can use a document management system, which records documents, users, user access privileges, and the like in a centralized system. Accordingly, information that is used in operations of the enterprise is in a central location. Typically, measures are put in place to ensure the security of the centrally stored information, and/or access to the centralized system. For example, multi-factor authentication can be implemented to authenticate users for access to the centralized system. As another example, information stored within the centralized system can be encrypted. Even in view of such measures, centralized systems are susceptible to hacking (e.g., access by malicious users), which may be used to access confidential information, change information, and/or conduct transactions within the centralized system.

Decentralized systems have been developed to enhance information security. An example decentralized system includes A so-called distributed ledger system (DLS), which can also be referred to as a consensus network, and/or a blockchain network. DLSs enable participating entities to securely, and immutably store data within a distributed ledger (blockchain). The distributed ledger is decentralized in that multiple nodes in the DLS have to reach consensus as to the information stored in the distributed ledger, and in that a copy of the ledger is stored in multiple nodes across the DLS. Although decentralized systems enhance security of information, transactions performed within decentralized systems are generally open for participants to see. That is, for example, although details of a transaction between two participants may be encrypted, the occurrence of the transaction is still visible to other users. Further, it can be difficult to properly identify users working within the decentralized system. For example, although users are typically identified by a unique identifier, it is not discernable as to who the actual actor is behind the unique identifier.

SUMMARY

Implementations of the present disclosure include computer-implemented methods for a hybrid enterprise system. More particularly, implementations of the present disclosure are directed to a hybrid enterprise system that includes a centralized sub-system, and a decentralized sub-system.

In some implementations, actions include receiving, by the centralized sub-system, change data representing a change to an electronic document stored in the centralized sub-system, the change data identifying a user that submitted the change, transmitting, by the centralized sub-system, the change to the decentralized sub-system, recording, by the decentralized sub-system, the change in a change log recorded in a blockchain that is maintained within the decentralized sub-system, the blockchain being stored in multiple nodes of the decentralized sub-system, and editing, by the centralized sub-system, the electronic document based on the change to provide an edited electronic document that is stored in the centralized sub-system. Other implementations include corresponding systems, apparatus, and computer programs, configured to perform the actions of the methods, encoded on computer storage devices.

These and other implementations may each optionally include one or more of the following features: the user data includes a universally unique identifier (UUID) assigned to the user; the at least a portion of the user data includes the UUID; the centralized sub-system stores the one or more electronic documents within a central repository; the decentralized sub-system includes a consortium blockchain network; the consortium blockchain network includes two or more consensus nodes provisioned by an enterprise that provides the hybrid enterprise system; and the hybrid enterprise system is provided by an enterprise and the user is an agent of a second-party that interacts with the enterprise.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure include a hybrid enterprise system and computer-implemented methods for provisioning the hybrid enterprise system. More particularly, implementations of the present disclosure are directed to a hybrid enterprise system that includes a centralized sub-system, and a decentralized sub-system. In some implementations, actions include receiving, by the centralized sub-system, change data representing a change to an electronic document stored in the centralized sub-system, the change data identifying a user that submitted the change, transmitting, by the centralized sub-system, the change to the decentralized sub-system, recording, by the decentralized sub-system, the change in a change log recorded in a blockchain that is maintained within the decentralized sub-system, the blockchain being stored in multiple nodes of the decentralized sub-system, and editing, by the centralized sub-system, the electronic document based on the change to provide an edited electronic document that is stored in the centralized sub-system.

Implementations of the present disclosure are described in further detail herein with reference to an example enterprise operations system that can be implemented on the hybrid enterprise system of the present disclosure. The example enterprise operations system includes a change management system that enables an enterprise to manage changes to one or mode documents. In an example context, the one or more documents can include contracts between the enterprise, and one or more second parties. For example, the hybrid enterprise system can include a chance management system that is independent to, or part of a contract management system. To this end, users of the enterprise, and/or of a second party periodically access the hybrid enterprise system. It is contemplated, however, that implementations of the present disclosure can be realized with any appropriate enterprise operations system, and any appropriate context.

To provide further context for implementations of the present disclosure, and as introduced above, enterprises leverage centralized systems to conduct operations. For example, a centralized system can provide a database that stores information in a single location (e.g., server, server pool). Because the information that is used in operations of the enterprise is in a central location, measures are put in place to ensure the security of the centrally stored information, and/or access to the centralized system. For example, multi-factor authentication can be implemented to authenticate users for access to the centralized system. As another example, information stored within the centralized system can be encrypted. Even in view of such measures, centralized systems are susceptible to hacking (e.g., access by malicious users), which may be used to access confidential information, change information, and/or conduct transactions within the centralized system.

Decentralized systems have been developed to enhance information security in a peer-to peer environment. An example decentralized system includes a so-called distributed ledger system (DLS), which can also be referred to as a consensus network, and/or a blockchain network. DLSs enable participating entities, so called peers, to securely, and immutably store data within a distributed ledger (blockchain). The distributed ledger is decentralized in that multiple nodes in the DLS have to reach consensus as to the information stored in the distributed ledger, and in that a copy of the ledger is stored in multiple nodes across the DLS. Although decentralized systems enhance security of information transactions performed within decentralized systems are generally open for participants to see. That is, for example, although details of a transaction between two participants may be encrypted, the occurrence of the transaction is still visible to other users. Further, it can be difficult to properly identify users working within the decentralized system. For example, although users are typically identified by a unique identifier, it is not discernable as to who the actual actor is behind the unique identifier.

In view of this, implementations of the present disclosure are directed to a hybrid enterprise system that includes a centralized sub-system, and a decentralized sub-system. In accordance with the example above, the hybrid enterprise system can execute a change management system (CMS) that can be accessed by users of an enterprise, and/or users of one or more second parties that interact with the enterprise. In some implementations, an electronic document is stored within the centralized sub-system, and a change log associated with the electronic document is stored in the decentralized sub-system. Accordingly, a single copy of the electronic document is stored in a centralized manner, while multiple copies of the change log are stored in a distributed manner. This enables peers of different companies to work together in a consortium on the same topics having another perspective on the topic. For example, a purchaser calls for a bid and asks suppliers to deliver quotes until a specified date. A third party, such as an auditor, could have a look into the tasks performed.

In accordance with implementations of the present disclosure, the centralized sub-system includes software, and one or more databases that are provided within a central system. In some examples, the central system can include one or more server systems that are operated by, or on behalf of the enterprise. In some examples, the enterprise (e.g., an administrative user of the enterprise) controls access to the centralized sub-system. For example, the enterprise can define users, user roles, access privileges, and the like to regulate user access to the centralized system. In some implementations, the access data is stored in the centralized system. For example, the access data for a user can include credentials (e.g., username, password) that are securely stored (e.g., encrypted in a central database).

In accordance with implementations of the present disclosure, the decentralized sub-system includes a DLS, referred to herein as a consensus network, or a blockchain network, that maintains a distributed ledger, referred to herein as a blockchain. A blockchain network is made up of peer-to-peer nodes, and enables participating entities to securely, and immutably conduct transactions, and store data. Although the term blockchain is generally associated with crypto-currency networks, blockchain is used herein to generally refer to a distributed ledger without reference to any particular use case. Advantages are achieved through the combination of the distributed ledger technology for open communication combined with the centralalized sub-system. It enables peer-to-peer business letting one enterprise system (e.g., enterprise resource planning (ERP) system) connect to others by real end-to-end processes across the systems of the peers.

A blockchain is made up of a chain of blocks, each block storing data. Example data includes transaction data representative of a transaction between two or more participants. While transactions are used herein by way of non-limiting example, it is contemplated that any appropriate data can be stored in a blockchain (e.g., documents, images, videos, audio). The transaction data (or their hashes) are immutably stored within the blockchain. That is, the transaction data cannot be changed. Accordingly, a blockchain is a data structure that stores data in a way that the data is immutable, and can be verified. Each block in the chain is linked to a previous block immediately before it in the chain by including a cryptographic hash of the previous block. Each block also includes a timestamp, its own cryptographic hash, and data. Each block is provided based on one or more transactions. Furthermore, the data can be in the centralized system, but the peers access is allowed by the blockchain. In the context of the instant application, a transaction can include a change to an electronic document (e.g., a contract). Example changes can include, without limitation, creating a document, editing a document, deleting a document.

The transactions, which have been verified by nodes of the blockchain network are hashed and encoded into a Merkle tree. More particularly, before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, the hash value is of fixed length. That is, no matter the size of the transaction data the length of the hash value is fixed. Hashing includes processing the transaction data through a hash function to generate the hash value. An example hash function includes, without limitation, the secure hash algorithm (SHA)-256, which outputs 256-bit hash values.

A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. This hash value is referred to as a Merkle root hash and is stored in a header of the block. A change in any of the transactions will result in change in its hash value, and ultimately, a change in the Merkle root hash. A hash purporting to be of a transaction stored in the tree can be quickly verified by determining whether it is consistent with the structure of the tree.

Whereas a blockchain is a data structure for storing transactions, a blockchain network is a network of computing nodes that manage, update, and maintain one or more blockchains. A blockchain network can be provided as a public blockchain network, a private blockchain network, or a consortium blockchain network. Implementations of the present disclosure are described in further detail herein with reference to a consortium blockchain network, which is private among the participating entities. It is contemplated, however, that implementations of the present disclosure can be realized in any appropriate type of blockchain network.

In general, a consortium blockchain network is private among the participating entities. In a consortium blockchain network, the consensus protocol is controlled by an authorized set of nodes, one or more nodes being operated by a respective entity (e.g., the enterprise operating the centralized sub-system, one or more second parties that interact with the enterprise). For example, a consortium of ten (10) entities can operate a consortium blockchain network, each of which operates at least one node in the consortium blockchain network. Blocks are added to the blockchain through the consensus protocol. Multiple nodes within the blockchain network participate in the consensus protocol, and perform work to have a block added to the blockchain. Such nodes are referred to as consensus nodes. Practical Byzantine fault tolerance (PBFT) is a non-limiting example of a consensus protocol. The consensus nodes execute the consensus protocol to add transactions to the blockchain, and update the overall state of the blockchain network.

In some examples, cryptography is implemented to maintain privacy of transactions. For example, if two nodes want to keep a transaction private, such that other nodes cannot discern details of the transaction, the nodes can encrypt the transaction data. Example cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key. An example could be an auditor who wants closer look to the tasks done between peers.

Asymmetric encryption is used to provide digital signatures, which enables participants in a transaction to confirm other participants in the transaction, as well as the validity of the transaction. For example, Participant A can digitally sign a message, and another node, Participant B, for example, can confirm that the message was sent by the node based on the digital signature of Participant A. Digital signatures can also be used to ensure that messages are not tampered with in transit. For example, Participant A is to send a message to Participant B. Participant A generates a hash of the message, and, using its private key, encrypts the hash to provide a digital signature as the encrypted hash. Participant A appends the digital signature to the message and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A and was not tampered with.

Figure 1:
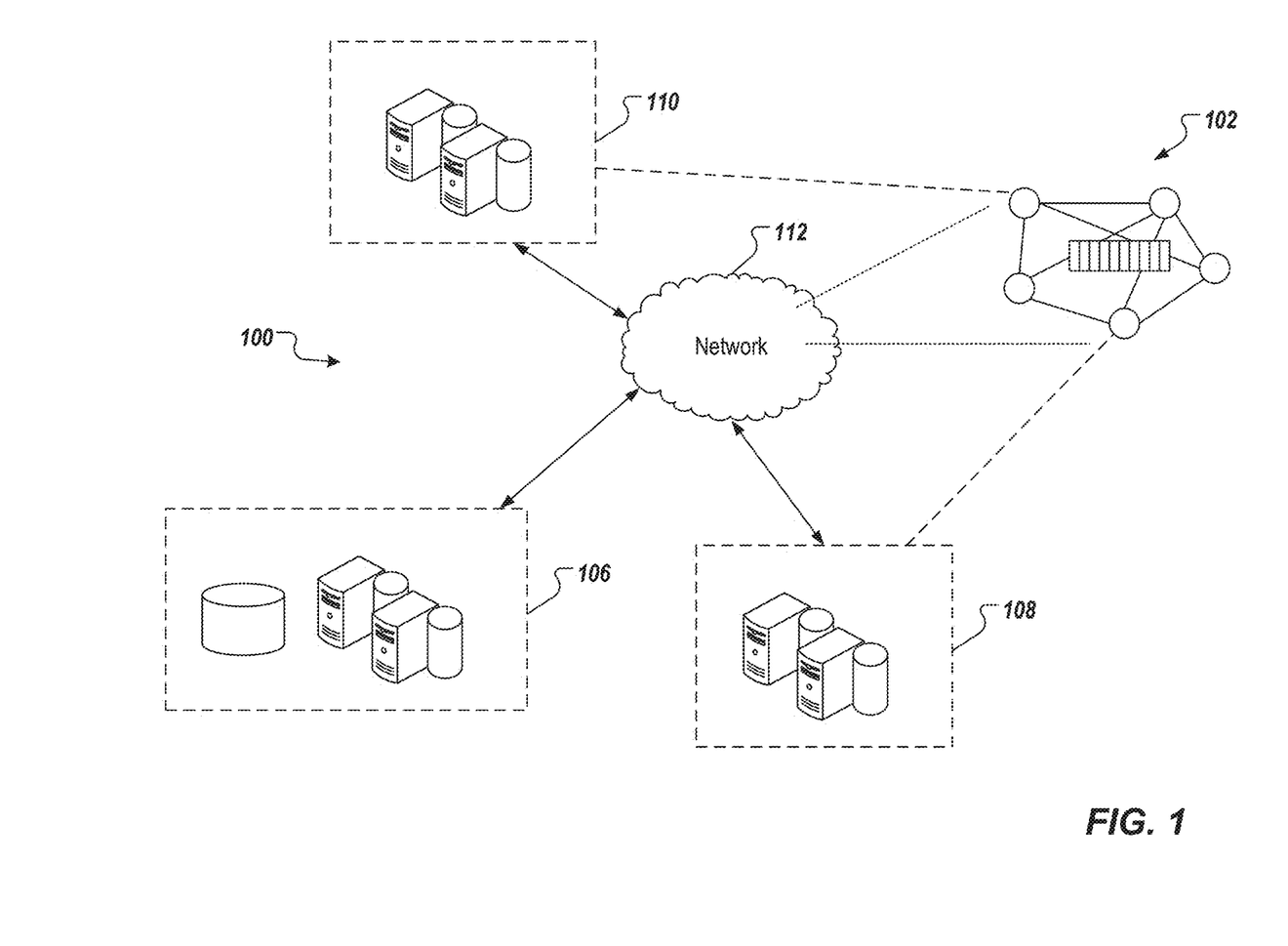
FIG. 1 depicts an example environment that can be used to execute implementations of the present disclosure.

FIG. 1 depicts an example environment 100 that can be used to execute implementations of the present disclosure. In some examples, the example environment 100 enables entities to participate in a consortium blockchain network 102. The example environment 100 includes computing systems 106, 108, 110 and a network 112. In some examples, the network 112 includes a local area network (LAN), wide area network (WAN), the Internet, or a combination thereof, and connects web sites, user devices (e.g., computing devices), and back-end systems. In some examples, the network 112 can be accessed over a wired and/or a wireless communications link. In some examples, the network 112 enables communication with, and within the consortium blockchain network 102. In general, the network 112 represents one or more communication networks.

In the depicted example, the computing system 106 can include any appropriate computing system that enables participation in the hybrid enterprise system of the present disclosure. Example computing devices include, without limitation, a server, a desktop computer, a laptop computer, a tablet computing device, and a smartphone. In some examples, the computing system 106 each hosts one or more computer-implemented services for providing a centralized sub-system of the hybrid enterprise system. For example, the computing system 108 can host at least a portion of CMS, which can include document editing (e.g., creating, modifying, deleting), access control (e.g., authorized users, credentials, roles, permissions), and administration (e.g., user onboarding).

In the depicted example, the computing systems 108, 110 can each include any appropriate computing system that enables participation as a node in the consortium blockchain network 102. Example computing devices include, without limitation, a server, a desktop computer, a laptop computer, a tablet computing device, and a smartphone. In some examples, the computing systems 108, 110 each hosts one or more computer-implemented services for interacting with the consortium blockchain network 102. For example, the computing system 108 can host computer-implemented services of a first entity (e.g., Participant A), such as transaction management system that the first entity uses to manage its transactions with one or more other entities (e.g., other participants). The computing system 110 can host computer-implemented services of a second entity (e.g., Participant B), such as transaction management system that the second entity uses to manage its transactions with one or more other entities (e.g., other participants). In the example of FIG. 1, the consortium blockchain network 102 is represented as a peer-to-peer network of nodes, and the computing systems 108, 110 provide nodes of the first entity, and second entity respectively, which participate in the consortium blockchain network 102. In some implementations, and as described in further detail herein, the blockchain network 102 provisions the decentralized sub-system of the hybrid enterprise system.

In accordance with implementations of the present disclosure, the hybrid enterprise system includes the computing system 106 and at least a portion of the blockchain network 102. For example, an enterprise can operate both the computing system 106 and the computing system 108, and can participate in the blockchain network 102. In some examples, the computing system 106 provides the centralized sub-system of the hybrid enterprise system, and the computing system 108 provides the decentralized sub-system of the hybrid enterprise system.

In accordance with the example context, a CMS enables an enterprise to manage documents (e.g., contracts) between the enterprise, and one or more second parties. To this end, users of the enterprise, and/or of a second party periodically access the hybrid enterprise system to participate in contracting activities, as described in further detail herein. In the example of FIG. 1, the computing system 110 can be operated by, or on behalf of an entity that engages with the enterprise that operates the hybrid enterprise system. For example, the enterprise and the entity can contract with each other for products and/or services, and the contracting activities can be managed using the hybrid enterprise system, as described in further detail herein. For example, if a patient allows a second doctor to see the same magnet resonance tomography (MRT) information the first doctor has seen instead of doing another MRT.

In accordance with implementations of the present disclosure, the centralized sub-system is used to execute processes that users participate in. That is, one or more users can each log into the centralized sub-system to perform activities. In the example context, example activities (also referred to herein as transactions) include, without limitation, creating, changing, and closing a contract. In some implementations, an account is established for each user that is to log into the centralized sub-system and conduct transactions. In some examples, an account includes a username, and credentials. In some examples, the account includes role(s) and/or permissions for a respective user. The username uniquely identifies a respective user among other users of the hybrid enterprise system. The credentials enable authentication of the user to ensure that the user is who they purport to be when logging into the hybrid enterprise system.

In accordance with implementations of the present disclosure, each user (e.g., natural person) is identified, verified, and onboarded to the hybrid enterprise system. The user is onboarded to the hybrid enterprise system before they are able to conduct any transactions. In some examples, a user can provide identity data that evidences their identity, and can be used to verify that the user is who they purport to be. Example identity data can include, without limitation, residence identification, passport, driving license, employee identification, birth certificate, and the like. For example, an administrative user and/or program can process the identity data to verify the user, and generate a user account for the user.

In some implementations, the user is assigned a universally unique identifier (UUID) that uniquely identifies the user among all other users of the hybrid enterprise system. For example, the UUID can be provided as a 128-bit number. In some examples, the UUID is used to uniquely identify the respective user within the centralized sub-system of the hybrid enterprise system, and is stored within the centralized sub-system. The user can log into the centralized sub-system using the UUID and associated authentication data (e.g., credentials, biometrics), and conduct transactions within the centralized sub-system.

In some implementations, the user is also uniquely identified within the decentralized sub-system. In some implementations, a hash value is generated using the UUID assigned to the user in the centralized sub-system. For example, the UUID alone, or in combination with other data associated with the user, can be processed through a hash function to generate the hash value used to uniquely identify the user within the decentralized sub-system. An example hash function includes, without limitation, SHA-256. In some examples, the hash value, also referred to herein as hash identifier (HID) is recorded within the decentralized sub-system. For example, the decentralized sub-system can process the HID as a transaction, and record the HID within the blockchain network as a block in the blockchain. Because copies of the blockchain are stored across multiple nodes in the blockchain network, the HID is stored across the multiple nodes in the blockchain network. In some implementations, the centralized sub-system generates the HID for the user, and submits the HID for recording to the blockchain.

Figure 2:
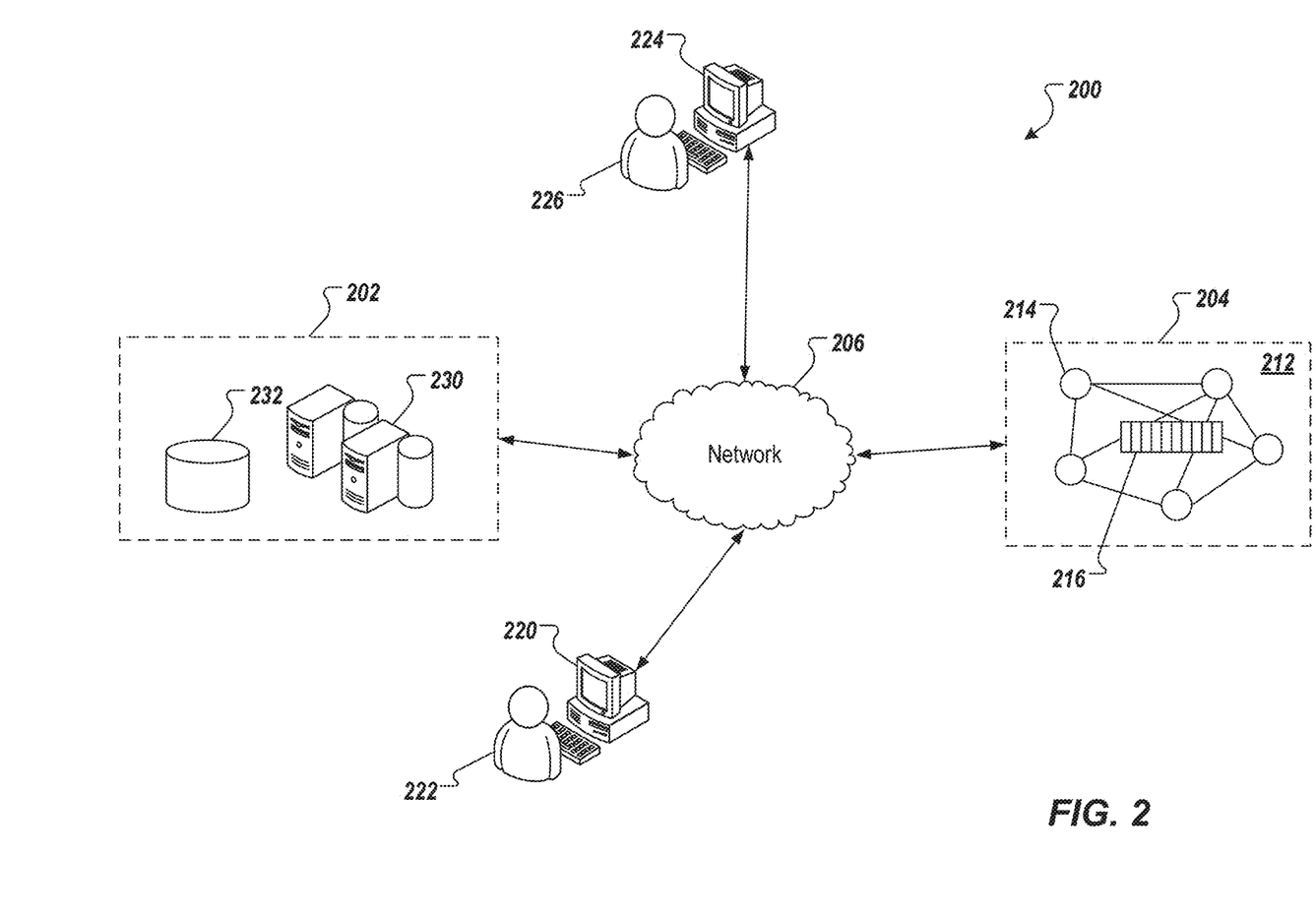
FIG. 2 depicts an example conceptual architecture in accordance with implementations of the present disclosure.

FIG. 2 depicts an example conceptual architecture 200 in accordance with implementations of the present disclosure. The example conceptual architecture 200 represents at least a portion of a hybrid enterprise system and includes a centralized sub-system 202, a decentralized sub-system 204, and a network 206. In some examples, the centralized sub-system 202, the decentralized sub-system 204, and the network 206 of FIG. 2 correspond to the computing system 106, the blockchain network 102, and the network 112, respectively, of FIG. 1.

In some implementations, an enterprise provides the centralized sub-system 202, and at least a portion of the decentralized sub-system 204. For example, the enterprise can provide the hybrid enterprise system, which includes the centralized sub-system 202, and the decentralized sub-system 204.

In the example of FIG. 2, the centralized sub-system 202 includes one or more computing devices 230 (e.g., servers) and a central repository 232. In some implementations, the computing devices 230 host a CMS, which can be part of, or independent of a document management system. In some examples, the computing devices 230 execute programs that enable users to interact with and store electronic documents (e.g., contracts). In some examples, the central repository 232 stores the electronic documents.

In the example of FIG. 2, the decentralized sub-system 204 includes a blockchain network 212 provided as a peer-to-peer network including a plurality of nodes 214, at least some of which immutably record information in a blockchain 216. As used herein, a node generally refers to an individual system (e.g., computer, server) that is connected to the blockchain network 212 and enables a respective participant to participate in the blockchain network. Although a single blockchain 216 is schematically depicted within the blockchain network 212, multiple copies of the blockchain 216 are provided, and are maintained across the blockchain network 212, as described in further detail herein. In some examples, the enterprise and the one or more second-parties each communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as consensus nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In some implementations, the enterprise operates one or more nodes 214 of the blockchain network 212. In some implementations, one or more second-parties that interact with the enterprise and access the hybrid enterprise system operate one or more nodes 214 of the blockchain network. In some implementations, only the enterprise operates consensus nodes that execute the consensus protocol to add transactions to the blockchain 216.

The example conceptual architecture 200 of FIG. 2 further includes a computing device 220 operated by a user 222, and a computing device 224 operated by a user 222. In some examples, the user 222 is an agent of the enterprise (e.g., an administrator employed by the enterprise) and interacts with the hybrid enterprise system through the computing device 220. In some examples, the user 226 is an agent of a second-party that interacts with the enterprise (e.g., a second-party that contracts with the enterprise). The user 226 interacts with the hybrid enterprise system through the computing device 220.

In some implementations, and as described herein, the user 226 has an account established within the hybrid enterprise system that enables the user 226 to log into the hybrid enterprise system and conduct transactions (e.g., edit documents). For example, the user 222 can onboard the user 226 to the hybrid enterprise system to enable the user 226 access to the hybrid enterprise system. In some examples, access of the user 226 is limited. For example, the user 226 is only able to access the centralized sub-system 202. In some implementations, and as described above, a UUID and an HID are assigned to the user 226. In some examples, the UUID assigned to the user 226 is stored within the centralized sub-system 202. In some examples, the HID assigned to the user 226 is stored within the blockchain 216.

In accordance with implementations of the present disclosure, the user 226 interacts with the hybrid enterprise system to create, edit, close, delete an electronic document (e.g., contract). In some implementations, the electronic document is stored in the centralized sub-system 202 (e.g., in the central repository) and the user 226 interacts with the electronic document through the centralized sub-system 202. For example, the user 226 can log into the centralized sub-system 202 to access a document editor through the computing device 224, which enables the user 226 to create, modify, and/or delete the electronic document.

In accordance with implementations of the present disclosure, while the electronic document is stored in and accessed through the centralized sub-system 202, a change log associated with the electronic document is maintained within the decentralized sub-system 204. That is, the change log is recorded to the blockchain 216, which is stored across multiple nodes. In some examples, each change is recorded as a transaction to the change log within the blockchain 216. In this manner, changes to electronic documents are transparent to all participants in the hybrid enterprise system. For example, a participant (e.g., the user 226) can submit a query to the decentralized sub-system 204 and, in response to the query, the change log can be provided, which indicates changes made to an electronic document, when the changes were made (e.g., timestamp), and which users made the changes (e.g., HID).

In view of the above, implementations of the present disclosure provide security for tasks that are to be transparent to participants in the consortium blockchain network. Even if each participant executes their own program/instance to change the electronic document, only one version of the electronic document exists (e.g., stored in the central repository 232 of the centralized sub-system 202), while the change log maintained in the decentralized sub-system 204 records the changes. In some examples, the electronic document can only be edited by a single participant, and can only be accessed by another participant after the electronic document has been closed within the centralized sub-system 202.

Figure 3:
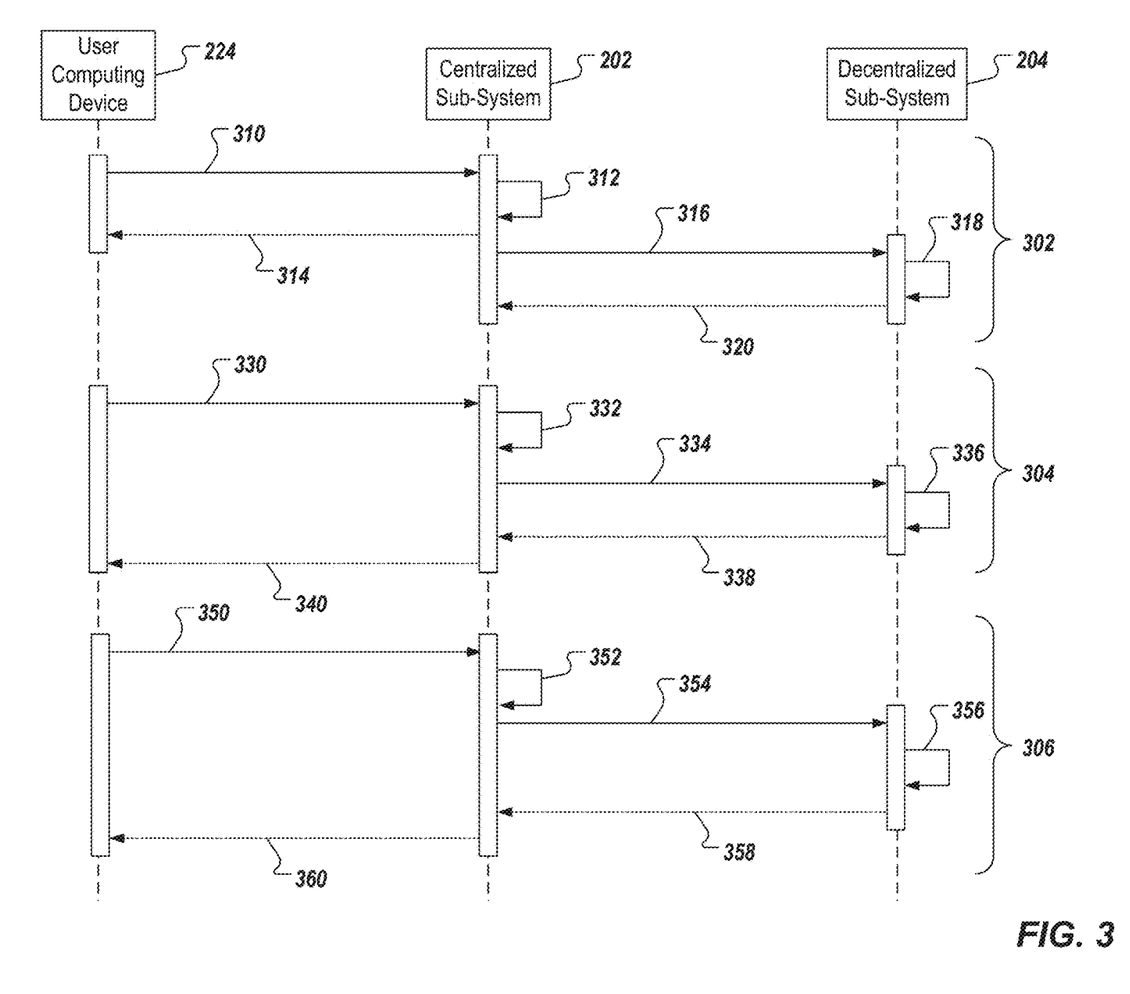
FIG. 3 depicts an example signal flow diagram depicting example interactions in accordance with implementations of the present disclosure.

FIG. 3 depicts example signal flows 302, 304, 306 that can be executed in accordance with implementations of the present disclosure. The example signal flows 302, 304, 306 represent communications between the computing device 224 (e.g., the user 226 using the computing device 224), the centralized sub-system 202, and the decentralized sub-system 204 of FIG. 2. The example signal flow 302 represents at least a portion of onboarding the user 226 for access to the hybrid enterprise system. The example signal flow 304 represents at least a portion of user access to an electronic document stored within the centralized sub-system 202. The example signal flow 306 represents at least a portion of user editing of the electronic document stored within the centralized sub-system 202.

With regard to the example signal flow 302, the user computing device 224 sends (310) identity information to the centralized sub-system 202. The centralized sub-system 202 processes (312) the identity information to provide an account for a user within the hybrid enterprise system. For example, the centralized sub-system 202 processes the identity information to identify and verify the user. In some examples, the account for the user is created in response to successful identification and verification of the user. As described herein, the account can include a UUID and associated authentication data (e.g., credentials, biometrics) of the user. In some examples, processing further includes generating a HID that is assigned to the user, as described herein. In some example, account information is returned (314) to the user. In this manner, the user is subsequently able to log into the hybrid enterprise system using the account information.

In some implementations, at least a portion of the account information is provided (316) to the decentralized sub-system 204. For example, at least the HID is provided to the decentralized sub-system 204. In some implementations, the decentralized sub-system 204 processes (318) the account information and records at least the HID to a blockchain (e.g., the blockchain 216 of FIG. 2). The decentralized sub-system 204 confirms (320) that the HID has been recorded to the blockchain.

With regard to the signal flow 304, the user computing device 224 sends (330) authentication information to the centralized sub-system 202. In some examples, the authentication information includes information required for the user to log into the hybrid enterprise system to access and interact with electronic documents. For example, the authentication information can include credentials such as username (e.g., UUID) and password. The centralized sub-system 202 processes (332) the authentication information to authenticate the user. For example, the centralized sub-system 202 can compare the received authentication information to stored authentication information to authenticate the user. If the user is not authenticated, an error can be sent to the user computing device 224.

If the user is authenticated, the centralized sub-system 202 sends (334) a transaction to the decentralized sub-system 204. In some examples, the transaction can represent a log into the centralized sub-system 202 and/or user access to an electronic document within the centralized sub-system 202. The decentralized sub-system 336 processes (336) the transaction to add the transaction to the blockchain. In some examples, the transaction is recorded within a block of the blockchain. In some examples, a change log is updated based on the transaction, and the change log is recorded within a block of the blockchain. In either case, the transaction is associated with the HID of the user within the blockchain. In this manner, the identity of the user can be determined (e.g., in a subsequent audit). The decentralized sub-system 204 confirms (338) that the HID has been recorded to the blockchain. The centralized sub-system 202 provides (340) a response to the user computing device 224 (e.g., confirming user access to the centralized sub-system and/or electronic document).

With regard to the signal flow 306, the user computing device 224 sends (350) a change to the centralized sub-system 202. For example, a document editor can display an electronic document in a display of the user computing device 224. The user can use the document editor to edit the electronic document (e.g., add text, remove text, edit text). The centralized sub-system 202 edits (352) the electronic document based on the change received from the user computing device 224 and stores (at least temporarily) the edited electronic document. The centralized sub-system 202 sends (354) a change log entry to the decentralized sub-system 204. In some examples, the change log entry is a data set that includes an identifier assigned to the electronic document, change data representing the change made to the electronic document, a timestamp indicating date/time that the change was made, and an identifier associated with the user (e.g., UUID, HID).

The decentralized sub-system 204 processes (356) the change log entry. In some examples, the decentralized sub-system 204 processes the change log entry to record the change log entry in a block of the blockchain. In some examples, the decentralized sub-system 204 updates a change log of the electronic document to include the change represented by the change log entry and records the updated change log in a block of the blockchain. The decentralized sub-system 204 confirms (358) that the change has been recorded to the blockchain. The centralized sub-system 202 provides (360) a response to the user computing device 224 (e.g., confirming that the change to the electronic document has been saved).

Figure 4:
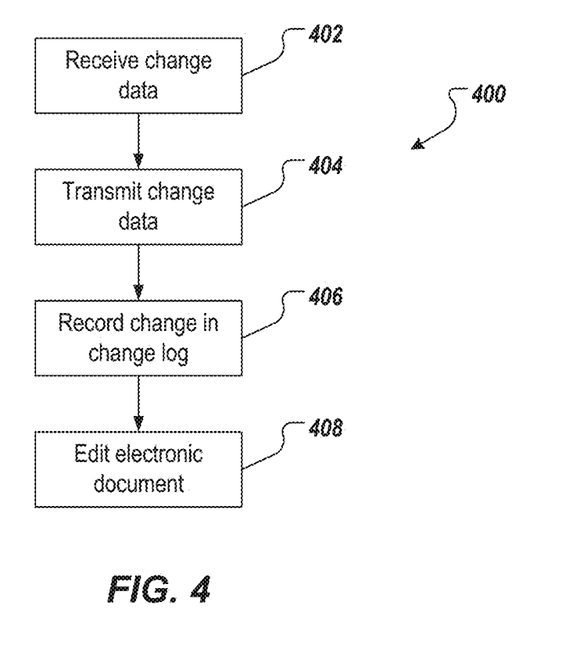
FIG. 4 depicts an example process that can be executed in accordance with implementations of the present disclosure.

FIG. 4 depicts an example process 400 that can be executed in accordance with implementations of the present disclosure. In some implementations, the example process 400 may be performed using one or more computer-executable programs executed using one or more computing devices. The example process 400 can be performed for change management in a hybrid enterprise system that includes a centralized sub-system and a decentralized sub-system. In some examples, the hybrid enterprise system is provided by an enterprise and the user is an agent of a second-party that interacts with the enterprise.

Change data is received (402). For example, the centralized sub-system receives change data representing a change to an electronic document stored in the centralized sub-system. In some examples, the change data identifies a user that submitted the change. In some examples, the change is associated with a hash identifier that is unique to the user, the hash identifier being generated based on at least a portion of user data used to access the hybrid enterprise system. In some examples, the at least a portion of user data includes a UUID assigned to the user. In some examples, the centralized sub-system stores the one or more electronic documents within a central repository.

Change data is transmitted (404). For example, the centralized sub-system transmits the change to the decentralized sub-system. In some example, the change is submitted as a transaction that is to be recorded in the decentralized sub-system. In some examples, the decentralized sub-system includes a consortium blockchain network. In some examples, the consortium blockchain network includes two or more consensus nodes provisioned by an enterprise that provides the hybrid enterprise system.

Change is recorded in change log (406). For example, the decentralized sub-system records the change in a change log recorded in a blockchain that is maintained within the decentralized sub-system. In some examples, the blockchain is stored in multiple nodes of the decentralized sub-system. The electronic document is edited (408). For example, the centralized sub-system edits the electronic document based on the change to provide an edited electronic document that is stored in the centralized sub-system.

Figure 5:
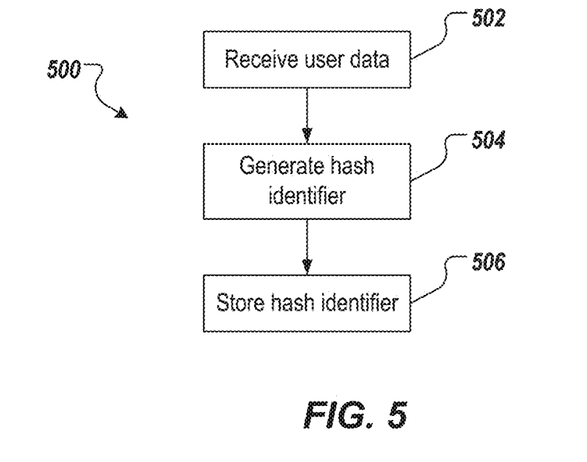
FIG. 5 depicts an example process that can be executed in accordance with implementations of the present disclosure.

FIG. 5 depicts an example process 500 that can be executed in accordance with implementations of the present disclosure. In some implementations, the example process 500 may be performed using one or more computer-executable programs executed using one or more computing devices. The example process 500 can be performed to provide a hybrid enterprise system include a centralized sub-system and a decentralized sub-system. In some examples, the hybrid enterprise system is provided by an enterprise and the user is an agent of a second-party that interacts with the enterprise.

User data is received (502). For example, the centralized sub-system receives user data representing a user that is authorized to access one or more electronic documents stored in the centralized sub-system. In some examples, the user data includes a UUID assigned to the user. In some examples, the centralized sub-system stores the one or more electronic documents within a central repository. A hash identifier is generated (504). For example, the hash identifier is unique to the user and is generated based on at least a portion of the user data. In some examples, the at least a portion of the user data includes the UUID.

The hash identifier is recorded (506). For example, the decentralized sub-system records the hash identifier in a blockchain that is maintained within the decentralized sub-system. In some examples, the blockchain is stored in multiple nodes of the decentralized sub-system. In some examples, the decentralized sub-system includes a consortium blockchain network. In some examples, the consortium blockchain network includes two or more consensus nodes provisioned by an enterprise that provides the hybrid enterprise system.

Figure 6:
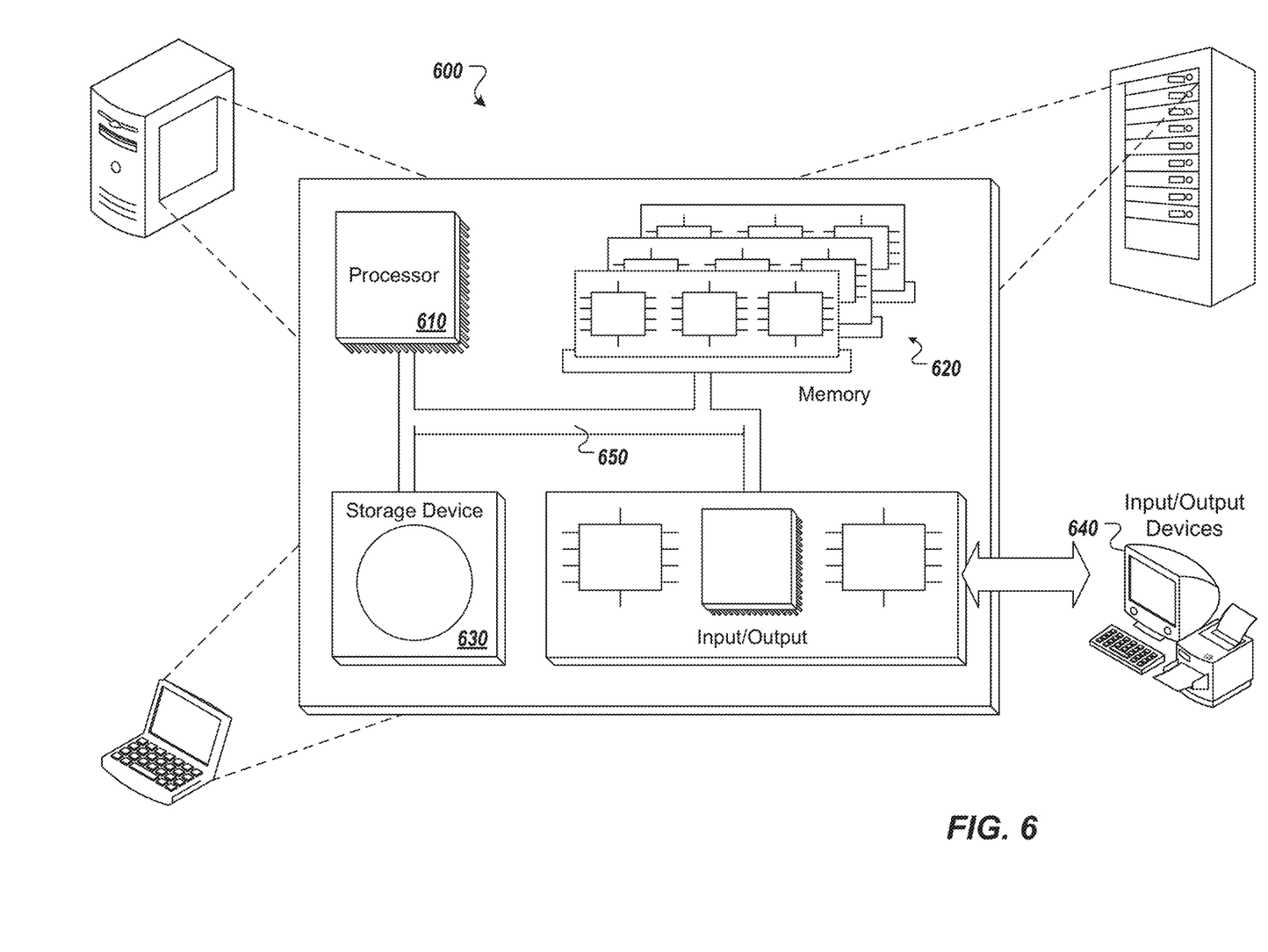
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

Implementations of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively, or in addition, the carrier may be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, implementations of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific implementation details, these should not be construed as limitations on the scope of what is being claimed, which is defined by the claims themselves, but rather as descriptions of features that may be specific to particular implementations. Certain features that are described in this specification in the context of separate implementations can also be realized in combination in a single implementation. Conversely, various features that are described in the context of a single implementations can also be realized in multiple implementations separately or in any suitable subcombination. Moreover, although features may be described above as acting in certain combinations and even initially be claimed as such, one or more features from a claimed combination can in some cases be excised from the combination, and the claim may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for change management in a hybrid enterprise system comprising a centralized sub-system and a decentralized sub-system, the method comprising:
    in response to authenticating a user by the centralized sub-system, transmitting, by the centralized sub-system, an authentication transaction to the decentralized sub-system to record the authentication transaction in a change log recorded in a blockchain that is maintained within the decentralized sub-system, the blockchain being stored in multiple nodes of the decentralized sub-system, the authentication transaction stored in the change log being indicative of a log into the centralized sub-system and user access of the user to an electronic document stored in the centralized sub-system;
    limiting, by the centralized sub-system, access to the electronic document in response to access of the user to the electronic document;
    subsequent to recording the authentication transaction in the blockchain, receiving, by the centralized sub-system, change data representing a change to the electronic document stored in the centralized sub-system, the change data identifying the user as having submitted the change;
    transmitting, by the centralized sub-system, the change to the decentralized sub-system;
    recording, by the decentralized sub-system, the change as a change log entry in the change log, the change log entry comprising an identifier assigned to the electronic document, the change data and the identifier of the user;
    sending, by the decentralized sub-system, a confirmation of the recording to the centralized sub-system;
    editing, by the centralized sub-system, the electronic document based on the change to provide an edited electronic document that is stored in the centralized sub-system; and
    unlimiting, by the centralized sub-system, access to the edited electronic document.

2. The method of claim 1, wherein the change is associated with a hash identifier that is unique to the user, the hash identifier being generated based on at least a portion of user data used to access the hybrid enterprise system.

3. The method of claim 2, wherein the at least a portion of user data comprises a universally unique identifier (UUID) assigned to the user.

4. The method of claim 1, wherein the centralized sub-system stores the one or more electronic documents within a central repository.

5. The method of claim 1, wherein the decentralized sub-system comprises a consortium blockchain network.

6. The method of claim 5, wherein the consortium blockchain network comprises two or more consensus nodes provisioned by an enterprise that provides the hybrid enterprise system.

7. The method of claim 1, wherein the hybrid enterprise system is provided by an enterprise and the user is an agent of a second-party that interacts with the enterprise.

8. A non-transitory computer-readable storage medium coupled to one or more processors and having instructions stored thereon which, when executed by the one or more processors, cause the one or more processors to perform operations for providing a hybrid enterprise system comprising a centralized sub-system and a decentralized sub-system, the operations comprising:
- in response to authenticating a user by the centralized sub-system, transmitting, by the centralized sub-system, an authentication transaction to the decentralized sub-system to record the authentication transaction in a change log recorded in a blockchain that is maintained within the decentralized sub-system, the blockchain being stored in multiple nodes of the decentralized sub-system, the authentication transaction stored in the change log being indicative of a log into the centralized sub-system and user access of the user to an electronic document stored in the centralized sub-system;
- limiting, by the centralized sub-system, access to the electronic document in response to access of the user to the electronic document;
- subsequent to recording the authentication transaction in the blockchain, receiving, by the centralized sub-system, change data representing a change to the electronic document stored in the centralized sub-system, the change data identifying the user as having submitted the change;
- transmitting, by the centralized sub-system, the change to the decentralized sub-system;
- recording, by the decentralized sub-system, the change as a change log entry in the change log, the change log entry comprising an identifier assigned to the electronic document, the change data and the identifier of the user;
- sending, by the decentralized sub-system, a confirmation of the recording to the centralized sub-system;
- editing, by the centralized sub-system, the electronic document based on the change to provide an edited electronic document that is stored in the centralized sub-system; and
    - unlimiting, by the centralized sub-system, access to the edited electronic document.

9. The computer-readable storage medium of claim 8, wherein the change is associated with a hash identifier that is unique to the user, the hash identifier being generated based on at least a portion of user data used to access the hybrid enterprise system.

10. The computer-readable storage medium of claim 9, wherein the at least a portion of user data comprises a universally unique identifier (UUID) assigned to the user.

11. The computer-readable storage medium of claim 8, wherein the centralized sub-system stores the one or more electronic documents within a central repository.

12. The computer-readable storage medium of claim 8, wherein the decentralized sub-system comprises a consortium blockchain network.

13. The computer-readable storage medium of claim 12, wherein the consortium blockchain network comprises two or more consensus nodes provisioned by an enterprise that provides the hybrid enterprise system.

14. The computer-readable storage medium of claim 8, wherein the hybrid enterprise system is provided by an enterprise and the user is an agent of a second-party that interacts with the enterprise.

15. A system, comprising:
one or more computers; and
a computer-readable storage device coupled to the computing device and having instructions stored thereon which, when executed by the computing device, cause the computing device to perform operations for providing a hybrid enterprise system comprising a centralized sub-system and a decentralized sub-system, the operations comprising:
- in response to authenticating a user by the centralized sub-system, transmitting, by the centralized sub-system, an authentication transaction to the decentralized sub-system to record the authentication transaction in a change log recorded in a blockchain that is maintained within the decentralized sub-system, the blockchain being stored in multiple nodes of the decentralized sub-system, the authentication transaction stored in the change log being indicative of a log into the centralized sub-system and user access of the user to an electronic document stored in the centralized sub-system;
- limiting, by the centralized sub-system, access to the electronic document in response to access of the user to the electronic document;
- subsequent to recording the authentication transaction in the blockchain, receiving, by the centralized sub-system, change data representing a change to the electronic document stored in the centralized sub-system, the change data identifying the user as having submitted the change;
- transmitting, by the centralized sub-system, the change to the decentralized sub-system;
- recording, by the decentralized sub-system, the change as a change log entry in the change log, the change log entry comprising an identifier assigned to the electronic document, the change data and the identifier of the user;
- sending, by the decentralized sub-system, a confirmation of the recording to the centralized sub-system;
- editing, by the centralized sub-system, the electronic document based on the change to provide an edited electronic document that is stored in the centralized sub-system; and
- unlimiting, by the centralized sub-system, access to the edited electronic document.

16. The system of claim 15, wherein the change is associated with a hash identifier that is unique to the user, the hash identifier being generated based on at least a portion of user data used to access the hybrid enterprise system.

17. The system of claim 16, wherein the at least a portion of user data comprises a universally unique identifier (UUID) assigned to the user.

18. The system of claim 15, wherein the centralized sub-system stores the one or more electronic documents within a central repository.

19. The system of claim 15, wherein the decentralized sub-system comprises a consortium blockchain network.

20. The system of claim 19, wherein the consortium blockchain network comprises two or more consensus nodes provisioned by an enterprise that provides the hybrid enterprise system.

* * * * *